United States Patent [19]

Heyn et al.

[11] 4,188,993

[45] Feb. 19, 1980

[54] HEAT RECOVERY SYSTEMS

[75] Inventors: Fred M. Heyn, Export; Ching-Feng Yin, Pittsburgh; Gordon L. Hanson, Bethel Park; Robert C. Schreck, Monroeville, all of Pa.

[73] Assignee: Thermal Transfer Division of Kleinewefers, Monroeville, Pa.

[21] Appl. No.: 931,257

[22] Filed: Aug. 4, 1978

Related U.S. Application Data

[62] Division of Ser. No. 805,187, Jun. 9, 1977, Pat. No. 4,129,176.

[51] Int. Cl.² .............................................. F28D 19/00
[52] U.S. Cl. .............................................. 165/8; 165/7; 165/9
[58] Field of Search ............................... 165/8, 9, 10, 7

[56] References Cited

U.S. PATENT DOCUMENTS

| | | | |
|---|---|---|---|
| 3,167,115 | 1/1965 | Chute | 165/8 X |
| 3,177,928 | 4/1965 | Tumavicus et al. | 165/9 X |
| 3,209,813 | 10/1965 | Hryniszak | 165/9 |
| 3,382,915 | 5/1968 | Turunen | 165/9 |
| 3,384,156 | 5/1968 | Addie | 165/9 X |
| 3,586,096 | 6/1971 | McLean | 165/9 |

Primary Examiner—Albert W. Davis, Jr.
Attorney, Agent, or Firm—Buell, Blenko & Ziesenheim

[57] ABSTRACT

A heat recovery system is provided for recovering heat from flue gases and the like and heating combustion air or the like in the form of a flue gas conduit receiving hot flue gas from a furnace or the like, a metallic recuperator receiving hot flue gas from said flue gas conduit, a ceramic regenerator selectively receiving at least a part of the hot flue gas leaving the metallic recuperator, by-pass means in parallel with the ceramic regenerator receiving any of the flue gas leaving the metallic recuperator which does not go through the ceramic regenerator, stack means receiving the flue gas from the by-pass means and the ceramic regenerator means for discharge to the atmosphere, means delivering air to be heated in parallel to the ceramic regenerator and the metallic recuperator, and conduit means receiving and combining heated air from the ceramic regenerator and the metallic recuperator for delivery to a point of use.

7 Claims, 4 Drawing Figures

HEAT RECOVERY SYSTEMS

This application is a division of our copending application Ser. No. 805,187, filed June 9, 1977 U.S. Pat. No. 4,129,176.

This invention relates to heat recovery systems and particularly to heat recovery systems using a combination of metallic recuperator and ceramic regenerator.

Recuperators and regenerators are well known and frequently used devices for the recovery of heat in various systems where it is desired to recover waste heat from flue gases for return to the system or for use in another system. Recuperators and regenerators of the past have taken many forms and have been of varied efficiency. Generally one or the other is used in a system.

The present invention provides a heat recovery system using both a metallic recuperator and a ceramic regenerator to optimize the systems performance and provide higher heat recovery rate and less expensive hardware design. The ceramic regenerator used in this combination is of novel construction without a metal shaft, thus eliminating the problems of operating a metal shaft at high temperatures.

Preferably the invention provides a metallic recuperator receiving hot flue gas, a ceramic regenerator receiving at least a part of the hot flue gas leaving the metallic recuperator, by-pass means receiving any of the flue gas leaving the metallic recuperator which does not go through the ceramic regenerator and a stack means receiving the flue gas from the regenerator and the by-pass for discharge to atmosphere, means delivering air selectively to the regenerator and to the metallic recuperator and means receiving heated air from the metallic recuperator and ceramic regenerator for delivery to the point of use. Preferably an air preheat temperature control is provided which regulates the amount of flue gas and input air passing through the ceramic regenerator so as to control the heat transfer taking place in the ceramic regenerator and thus the output temperature of the air. Preferably a dilution air input means is provided for overheat protection in the system.

In the foregoing general description certain objects, purposes and advantages of this invention have been set out. Other objects, purposes and advantages of this invention will be apparent from a consideration of the following description and the accompanying drawings in which.

Figure 1:
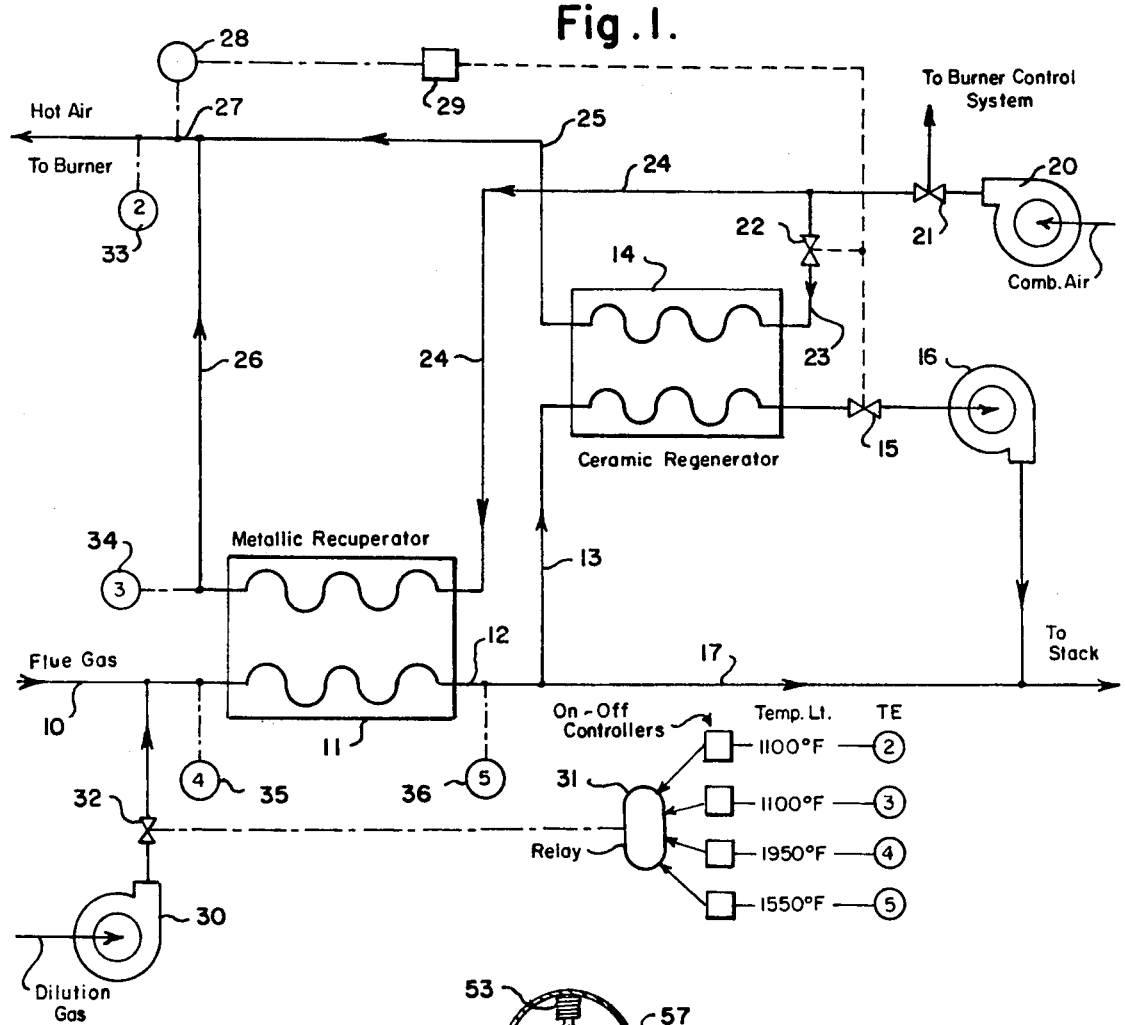
FIG. 1 is a schematic flow diagram of the system of this invention.
Figure 4:
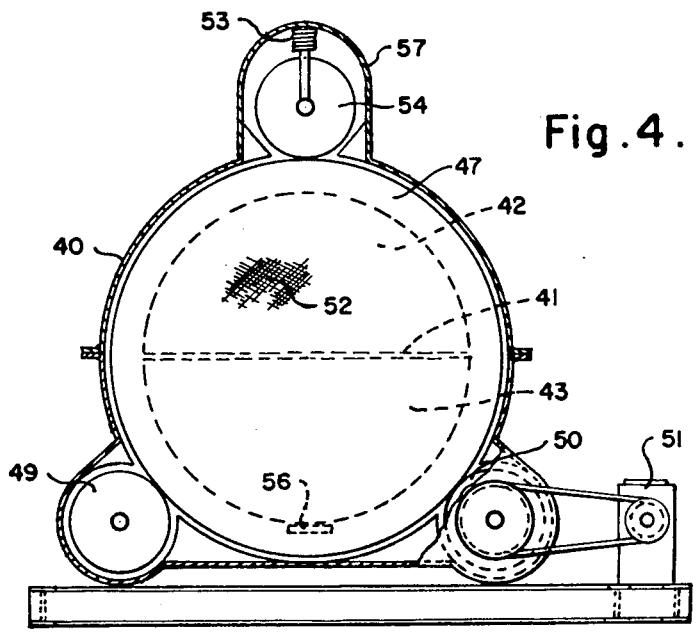
FIG. 4 is a section on the line IV—IV of FIG. 3.
Figure 2:
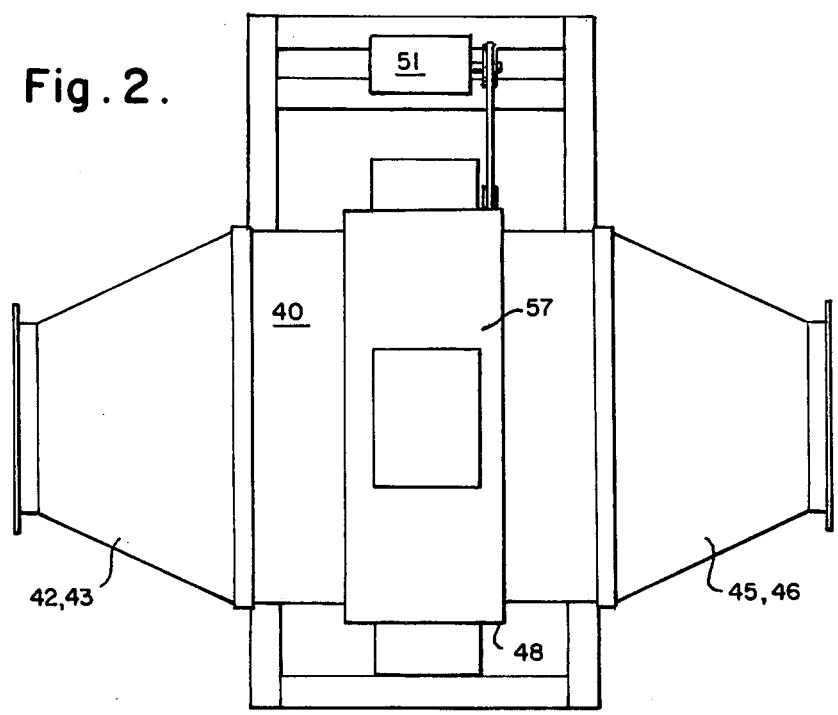
FIG. 2 is a top plan view of ceramic regenerator according to this invention.
Figure 3:
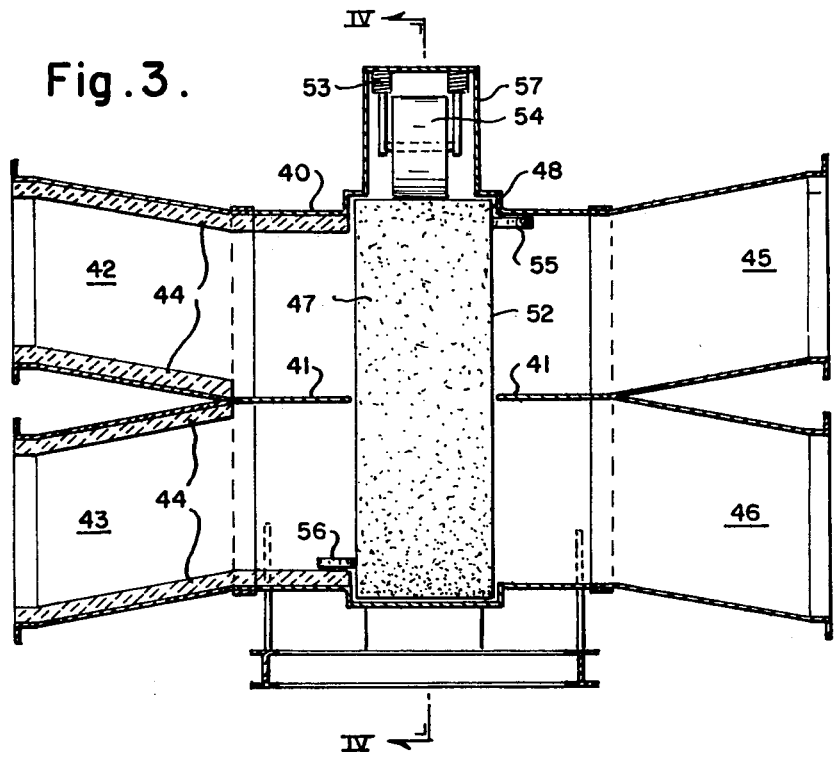
FIG. 3 is a section on the line III—III of FIG. 2.

Referring to the drawings hot flue gas from a furnace or the like, not shown, enters through line 10 into metallic recuperator 11 and leaves through line 12. Downstream from metallic recuperator 11, the flue gas is divided, part going by way of line 13 to ceramic regenerator 14 through control valve 15, fan 16 to stack, not shown. The balance of the flue gas is by-passed through by-pass line 17 to stack. Input or combustion air to be preheated is drawn in by combination air fan 20, passed through valve 21 of a burner control system and divided selectively by valve 22, one part going to ceramic regenerator 14 by way of line 23 and the other to metallic recuperator 11 by way of line 24. The heated air leaving the ceramic regenerator 14 by way of line 25 is combined with heated air leaving the metallic recuperator 11 by way of line 26 in line 27. The air preheat temperature after mixing in line 27 is measured by temperature sensor 28 which energizes temperature controller 29 which in turn regulates valves 15 and 22 to increase or decrease both the flow of flue gas and air in the same proportion passing through the ceramic regenerator. Thus when the air preheat temperature in line 27 is less than the desired set point, the controller 29 will open valves 15 and 22 allowing more heat transfer to take place in the ceramic regenerator which has a higher efficiency than the metallic recuperator. On the other hand, if the air preheat temperature in line 27 is higher than the desired set point the temperature regulator 29 will reduce the openings in valves 15 and 22 to decrease the amount of heat.

Overheat protection for the system is provided through air dilution fan 30 controlled by relay circuit 31 through valve 32. The relay circuit is energized by signals from temperature sensors 33 in line 27, 34 in line 26, 35 in line 10 and 36 in line 12. When the temperature at any of sensors 33 through 36 exceeds a pre-determined set point, relay circuit 31 opens valve 32 and dilution air from fan 30 enters the system to lower the temperature.

The metallic recuperator may be of any conventional design such as that illustrated in Heyn et al. U.S. Pat. No. 3,602,296.

The ceramic regenerator is preferably in the form of a central cylindrical housing 40 divided horizontally by divider plates 41. Hot flue gas duct 42 is connected to the upper half of housing 40 and a divider plate 41. Hot air duct 43 is connected to the lower half of housing 40 and divider plate 41 on the same end of housing 40 as hot flue gas duct 42. Both the hot flue gas duct 42 and hot air duct 43 are provided with insulation 44 as is the adjacent portion of housing 40. The opposite end of housing 40 is provided with a flue gas outlet duct 45 and a cold air inlet duct 46 both connected to horizontal divider 41. A ceramic wheel 47 rests in a well 48 in housing 40 on supporting wheels 49 and 50, one of which 50 is driven by an electric motor 51 so as to rotate the ceramic wheel within the housing. The ceramic wheel is provided with a matrix type construction such as a honeycomb 52 which permits the gases to pass through the wheel with the maximum contact with the wheel. This construction, with slow rotation of the wheel, assures that every segment of the wheel is placed alternately in the flue gas and in the air flow thus carrying heat from the hotter side to the colder side of the regenerator. A spring 53 loaded third wheel 54 is provided on top of the ceramic wheel to insure positive frictional drive between the driven support wheel 50 and the ceramic wheel 47. Small transverse rollers 55 and 56 are mounted in housing 40 at the top and bottom of the housing bearing against the face of the ceramic wheel to counteract the dynamic pressure of the gas flow through the regenerator. The well 48 is divided into two substantially half sections by a removable upper section 57 which parts from the housing on the center line of the wheel and may be removed upwardly. Thus the ceramic wheel may be readily removed and serviced without disconnecting any duct work. Moreover, there is no ceramic metal joint in the structure of this invention and thus the problems associated with such joints are eliminated.

There are many advantages in the system of this invention. With the use of a combination of metallic recuperator and ceramic regenerator, the heat recovery system costs less and uses less floor space, it can work at a higher flue gas temperature than a ceramic regenerator alone, thus requiring less dilution air, the ceramic regenerator is subject to flue gas at a much more uniform temperature. The specific ceramic regenerator here claimed adds the additional advantages that the ceramic regenerator wheel is supported by friction wheels with no metal shaft and the ceramic wheel has no contact, joint or seal with the attendant problems and the upper wheel housing and the ceramic wheel can be removed without disconnecting any duct work.

In the foregoing specification certain preferred practices and embodiments of this invention have been set out, however, other practices and embodiments will be apparent within the scope of the following claims.

We claim:

1. A ceramic regenerator comprising a generally cylindrical housing, a transverse central generally cylindrical well in said housing of slightly larger diameter coaxial therewith and being divided into two substantially half sections by a removable upper section, a ceramic regenerator wheel removably insertable in said well, a pair of spaced apart rotating support means on parallel axes in the same horizontal plane in the housing in said well beneath and supporting said ceramic regenerator wheel in direct frictional contact with the periphery of the ceramic wheel, drive means driving at least one of said support means, said wheel being of axial matrix construction, a divider means in the housing on each side of the well on the diameter of the housing dividing the housing into two passages said well and divider means being in general sealing relation to said wheel and a pair of ducts at each end of said housing connected to said housing and said divider means to form a pair of generally parallel passages through the housing and ceramic wheel.

2. A ceramic regenerator as claimed in claim 1 having rotary pressure means in said removable upper section acting on top of said wheel urging it into contact with the support and drive means.

3. A ceramic regenerator as claimed in claim 1 wherein the ceramic regenerator wheel is of axial honeycomb construction.

4. A ceramic regenerator as claimed in claim 1 wherein the rotating support and drive means is a pair of spaced apart wheels on parallel axes, at least one being driven and drive means driving at least one of said spaced apart wheels.

5. A ceramic regenerator as claimed in claim 1 having guide wheels in the housing adjacent the well on opposite sides of the divider means and on opposite sides of the ceramic wheel bearing on the edge of the ceramic wheel opposite the direction of gas flow to center the wheel in said well against the pressure of flowing gases.

6. A ceramic regenerator as claimed in claim 1 wherein the well is open on the horizontal diameter of the housing and the divider means in the housing is on the same diameter.

7. A ceramic regenerator as claimed in claim 1 having small air passages in the housing around the edge of the ceramic wheel through which air passes as a cooling agent.

* * * * *